(12) United States Patent
Slayter et al.

(10) Patent No.: US 10,648,368 B2
(45) Date of Patent: May 12, 2020

(54) DRIVE ASSEMBLY FOR A GAS TURBINE ENGINE

(71) Applicant: Hamilton Sundstrand Corporation, Charlotte, NC (US)

(72) Inventors: Matthew Allen Slayter, Rockford, IL (US); Tyler L. Klipp, Roscoe, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 625 days.

(21) Appl. No.: 15/472,357

(22) Filed: Mar. 29, 2017

(65) Prior Publication Data

US 2018/0283218 A1 Oct. 4, 2018

(51) Int. Cl.
| | | |
|---|---|---|
| F01D 25/36 | (2006.01) | |
| F02C 7/32 | (2006.01) | |
| F02C 7/36 | (2006.01) | |
| F02C 7/277 | (2006.01) | |

(52) U.S. Cl.
CPC ............. *F01D 25/36* (2013.01); *F02C 7/277* (2013.01); *F02C 7/32* (2013.01); *F02C 7/36* (2013.01); *F05D 2220/32* (2013.01); *F05D 2260/40311* (2013.01); *F05D 2260/57* (2013.01); *F05D 2260/85* (2013.01)

(58) Field of Classification Search
CPC .......... F01D 25/34; F01D 25/36; F01D 15/12; F02C 7/275; F02C 7/277; F02C 7/32; F02C 7/36; F16H 1/28; F16H 35/18; H01F 7/1607; H01F 7/18; F05D 2220/32; F05D 2260/403; F05D 2260/4031; F05D 2260/40311; F05D 2260/53; F05D 2260/57; F05D 2260/85
See application file for complete search history.

(56) References Cited

U.S. PATENT DOCUMENTS

| | | | |
|---|---|---|---|
| 3,021,719 A | 2/1962 | Conrad, Jr. | |
| 4,018,094 A | 4/1977 | Schmidt | |
| 8,490,410 B2 | 7/2013 | Suciu et al. | |
| 2006/0260323 A1 | 11/2006 | Moulebhar | |
| 2007/0151258 A1* | 7/2007 | Gaines | F02C 7/36 60/792 |

(Continued)

FOREIGN PATENT DOCUMENTS

| | | |
|---|---|---|
| EP | 3205850 | 8/2017 |
| EP | 3266992 | 1/2018 |
| GB | 1091833 | 11/1967 |

OTHER PUBLICATIONS

European Search Report for European Patent Application No. 18164550 completed Jul. 25, 2018.

*Primary Examiner* — Bryan M Lettman
*Assistant Examiner* — Charles W Nichols
(74) *Attorney, Agent, or Firm* — Carlson, Gaskey & Olds, P.C.

(57) ABSTRACT

A drive assembly for a gas turbine engine according to an exemplary embodiment includes, among other things, an epicyclic gear train having an input and an output, the input coupled to a first turbine, the output coupled to an accessory drive shaft, and at least one engagement feature on a component of the gear train. An actuator is engageable with the at least one engagement feature to cause the accessory drive shaft to rotate. A method of driving a section of a gas turbine engine is also disclosed.

3 Claims, 4 Drawing Sheets

(56) References Cited

U.S. PATENT DOCUMENTS

| | | | | |
|---|---|---|---|---|
| 2010/0264670 A1* | 10/2010 | Usami | ............... | F02N 11/0844 |
| | | | | 290/38 R |
| 2012/0015776 A1* | 1/2012 | Lemmers, Jr. | ........ | F01D 21/006 |
| | | | | 475/271 |
| 2013/0167679 A1* | 7/2013 | Bastier | ................. | F16H 35/00 |
| | | | | 74/411.5 |
| 2014/0199157 A1* | 7/2014 | Haerms | ................. | F01D 21/06 |
| | | | | 415/1 |
| 2014/0318144 A1 | 10/2014 | Lazzeri et al. | | |
| 2016/0312710 A1* | 10/2016 | Eifert | ..................... | F02C 7/27 |

\* cited by examiner

US 10,648,368 B2

DRIVE ASSEMBLY FOR A GAS TURBINE ENGINE

BACKGROUND

This disclosure relates to a gas turbine engine, and more particularly to slow turning of one or more sections of the gas turbine engine.

A gas turbine engine typically includes at least a fan section, a compressor section, a combustor section, and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section.

Gas turbine engines typically operate with relatively small radial clearances in the engine core between the compressor and turbine blades and adjacent structure in order to optimize the efficiency of the engine. When the engine is shut down, heat from the engine core rises to a top of the engine case. This uneven distribution of heat can result in an engine longitudinal axis bending or "bowing." If the engine is restarted in this condition, it can result in contact of the blades with adjacent structure or reduced performance due to blade imbalance.

SUMMARY

A drive assembly for a gas turbine engine according to an exemplary aspect of the present disclosure includes, among other things, an epicyclic gear train having an input and an output, the input coupled to a first turbine, the output coupled to an accessory drive shaft, and at least one engagement feature on a component of the gear train. An actuator is engageable with the at least one engagement feature to cause the accessory drive shaft to rotate.

A gas turbine engine according to an exemplary aspect of the present disclosure includes, among other things, a spool including a turbine section configured to drive a compressor section through a spool shaft. A drive assembly for driving the spool comprises an epicyclic gear train having an input and an output, the input coupled to a first turbine for starting the engine, the output coupled to the spool shaft, and at least one engagement feature on a component of the gear train. An actuator is engageable with the at least one engagement feature to cause the spool shaft to rotate.

A method of driving a section of a gas turbine engine according to an exemplary aspect of the present disclosure includes, among other things, moving an actuator into contact with at least one engagement feature of an epicyclic gear train during a slow rotation condition, rotating a gear of the epicyclic gear train in response to the actuator moving the at least one engagement feature, and rotating a spool in response to rotating the gear, the spool being included in the section of the gas turbine engine, and a towershaft interconnecting the spool and the epicyclic gear train.

The various features and advantages of disclosed embodiments will become apparent to those skilled in the art from the following detailed description. The drawings that accompany the detailed description can be briefly described as follows.

DETAILED DESCRIPTION

Figure 1:
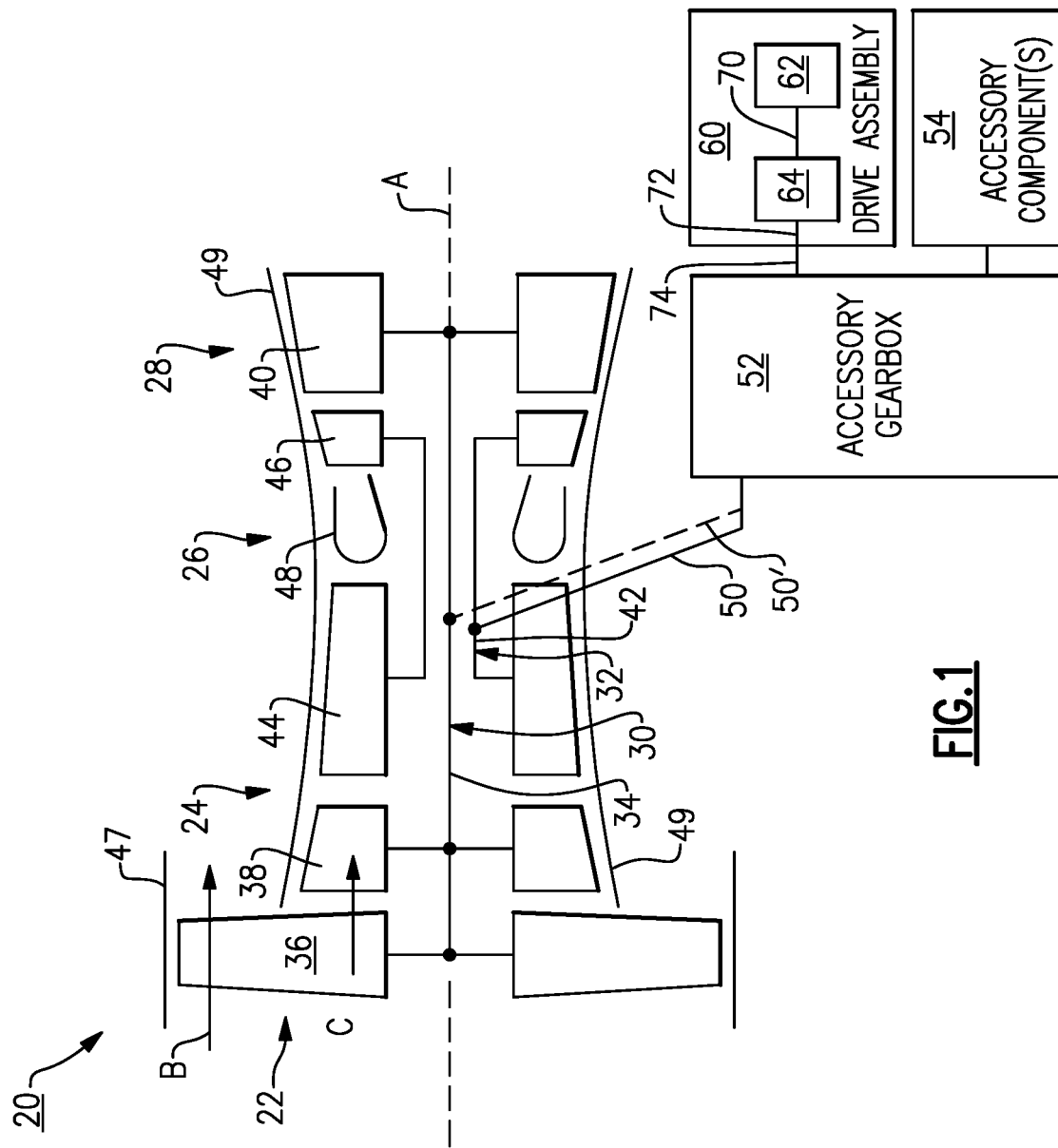
FIG. 1 is a schematic view of an example gas turbine engine.

FIG. 1 schematically illustrates a gas turbine engine 20. The gas turbine engine 20 includes a fan section 22, a compressor section 24, a combustor section 26 and a turbine section 28. In the illustrated example, the gas turbine engine 20 is a two-spool turbofan for propulsion of an aircraft. The fan section 22 drives air along a bypass flow path B, while the compressor section 24 drives air along a core flowpath C for compression and communication into the combustor section 26 then expansion through the turbine section 28. Although the example engine 20 is depicted as a two-spool turbofan gas turbine engine, it should be understood that the concepts disclosed herein are not limited to use with turbofans as the teachings may be applied to other types of turbine engines, such as engines having fewer or more than two spools, and industrial and marine applications.

The engine 20 generally includes a low spool 30 and a high spool 32 mounted for rotation about an engine axis A relative to an engine static structure. The low spool 30 generally includes an inner turbine or spool shaft 34 that interconnects a fan 36 having a plurality of fan blades, a low pressure compressor 38 and a low pressure turbine 40. The high spool 32 includes an outer turbine or spool shaft 42 that interconnects a high pressure compressor 44 and a high pressure turbine 46. A combustor 48 is arranged between the high pressure compressor 44 and the high pressure turbine 46. The inner spool shaft 34 and the outer spool shaft 42 are concentric and rotate about the engine axis A.

Airflow delivered to the core flowpath C by the fan 36 is compressed by the low pressure compressor 38 then the high pressure compressor 44, mixed and burned with fuel in the combustor 48, then expanded over the high pressure turbine 46 and the low pressure turbine 40. The turbines 40/46 rotationally drive the respective spools 30/32 in response to the expansion. A fan case 47 at least partially surrounds the fan 36. An engine case 49 at least partially surrounds the spools 30/32. The engine case 49 can be one or more static structures that provide an engine backbone for supporting the compressor section 24, combustor section 26 and turbine section 28. The fan case 47 and engine case 49 can be arranged adjacent to a nacelle assembly to guide airflow relative to the engine 20.

A towershaft 50 is geared to the high spool 32 to drive an accessory gearbox 52 which may be utilized to drive one or more accessory components 54. Example accessory components 54 can include a hydraulic pump, a lubrication pump, an alternator, an auxiliary gearbox, and a fuel pump.

The engine 20 is coupled to a drive assembly 60 for driving one of spools 30/32 during a slow rotation condition or an engine start condition. The drive assembly 60 includes an input 70 and an output 72. The accessory gearbox 52 interconnects the outer spool shaft 42 of the high spool 32 and the output 72. In other examples, the accessory gearbox 52 mechanically couples the inner spool shaft 34 of the low spool 30 and the drive assembly 60 via towershaft 50'.

The drive assembly 60 includes a drive turbine 62 mechanically coupled to the high spool 32 via a gear train 64. In alternative examples, the drive assembly 60 is mechanically coupled to the low spool 30. The drive assembly 60 can function as a starter in which the drive turbine 62 drives the high spool 32 during an engine start condition. The drive turbine 62 can be a pneumatic turbine coupled to a pressurized fluid source, such as, compressed air from a ground cart, auxiliary power unit (APU) or bleed air from sections of another engine 20, for example. The drive turbine 62 can be used to both start and motor the engine 20. The drive turbine 62 may be designed primarily for short duration transient operations, and not continuous motoring at low speeds. In other examples, the drive turbine 62 can be an electric motor powered by an auxiliary power unit, or can be driven by a hydraulic source.

Figure 2:
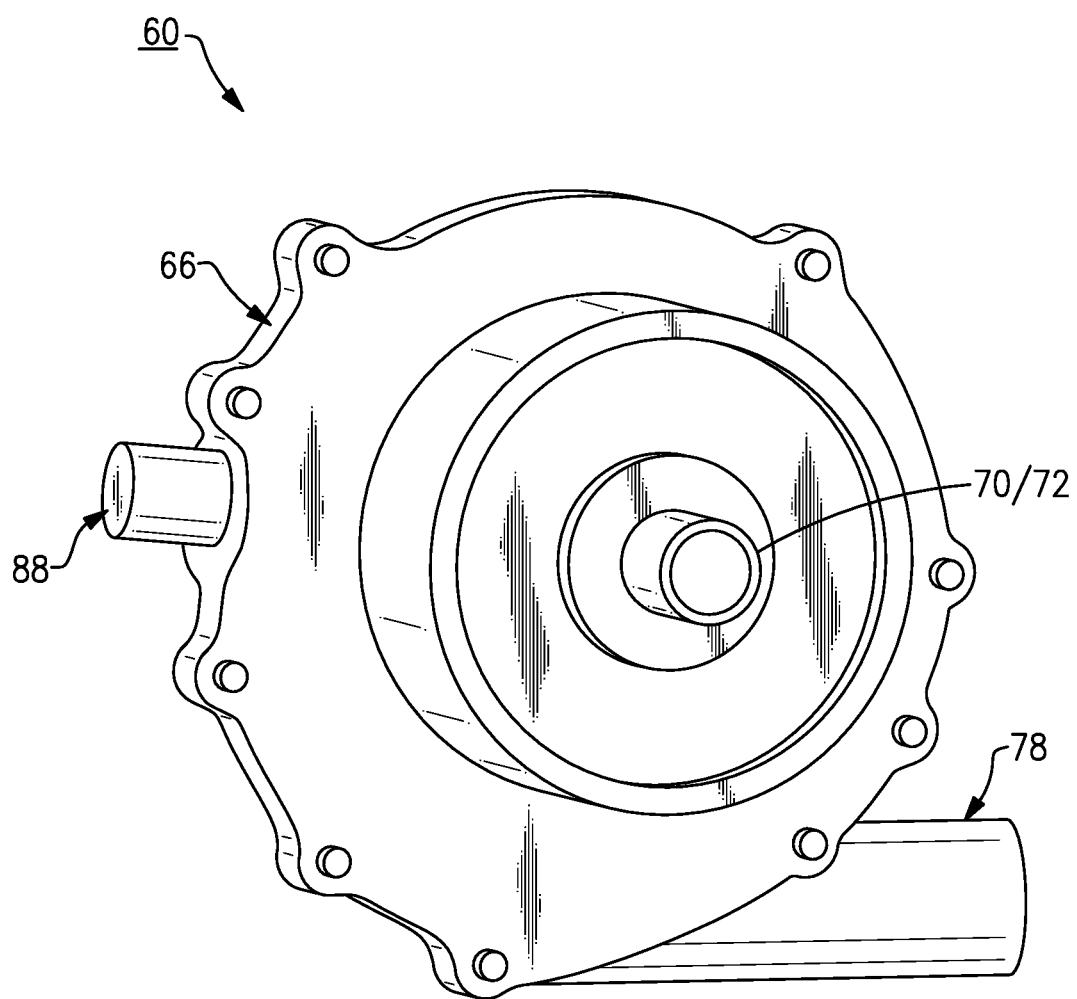
FIG. 2 is a perspective view of a drive assembly.
Figure 3:
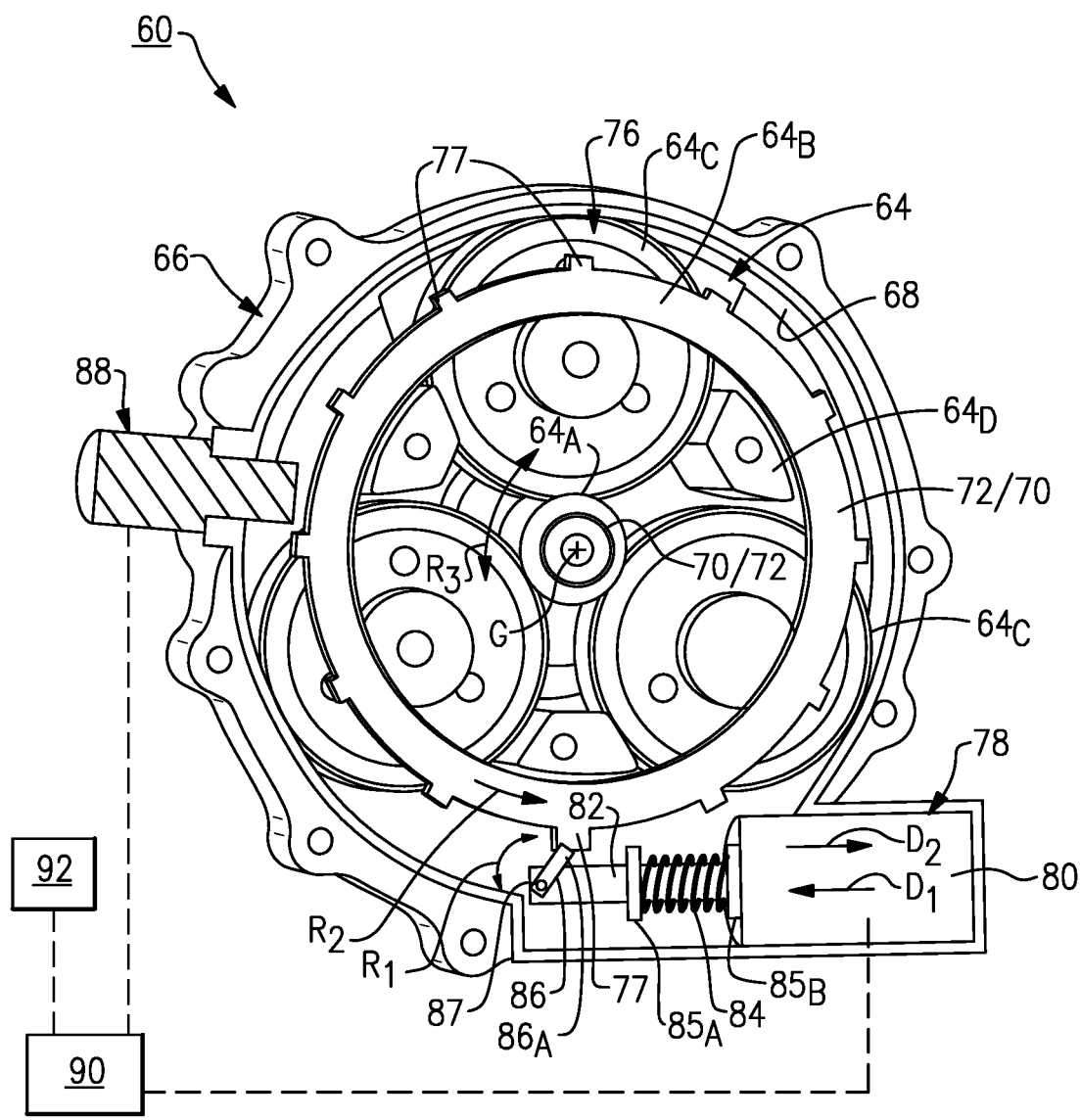
FIG. 3 is a sectional view of the drive assembly of FIG. 2.

Referring to FIGS. 2 and 3, the drive assembly 60 includes a housing 66 which defines a cavity 68 for at least partially receiving the drive turbine 62 (FIG. 1) and the gear train 64. The drive assembly 60 is arranged such that the drive turbine 62 and the gear train 64 are enclosed by the housing 66 or are otherwise integrated into a single assembly.

The gear train 64 can be an epicyclic gear train such as a star gear system or a planetary system having a plurality of gears in mesh relationship, and can be set to impart a speed change. In the illustrated example, the gear train 64 is a star gear system including a sun gear 64A, a ring gear 64B, a plurality of star gears 64C meshing with the sun gear 64A and the ring gear 64B, and a static carrier 64D coupled to the star gears 64C. The sun gear 64A and the ring gear 64B are coupled to, or otherwise define, input 70 and output 72 of the gear train 64, respectively. The input 70 is mechanically coupled to the drive turbine 62 (FIG. 1) for rotation during an engine start condition. In the illustrated example, the output 72 is mechanically coupled to an accessory drive shaft 74 of the accessory gearbox 52 (FIG. 1). In another example, the ring gear 64B is coupled to input 70, and the sun gear 64A is coupled to output 72.

The gear train 64 has at least one engagement feature 76 on a component of the gear train 64 that cooperates with an actuator 78. The actuator 78 is at least partially received in the cavity 68 of the housing 66. Interaction of the engagement feature 76 and actuator 78 causes the gear train 64 to rotate the accessory drive shaft 74 during a slow rotation condition, thereby causing the respective spool 30/32 to rotate at a desired rate or speed to substantially uniformly dissipate heat from the respective compressor or turbine rotor(s). For the purposes of this disclosure, "slow rotation" refers to rotation of at least one of the spools 30/32 at a relatively slower rate than during an engine start condition or during normal operation of the engine 20 such as during takeoff or cruise.

In the illustrated example, the ring gear 64B defines the engagement feature 76. Locating the engagement feature 76 at the ring gear 64B can reduce a rate of cycling the actuator 78 to drive the output 72 at a desired rate. In other examples, the engagement feature 76 is defined by, or is otherwise coupled to, one of the star gears 64C or the sun gear 64A to impart rotation in response to engagement between the engagement feature 76 and the actuator 78.

The engagement feature 76 defines one or more protrusions 77 circumferentially arranged about a perimeter of the ring gear 64B. The protrusions 77 can be integrally formed with or otherwise coupled to the ring gear 64B. In other examples, the engagement feature 76 includes one or more recesses along the perimeter of the ring gear 64B.

The actuator 78 is a linear actuator including a solenoid 80 having an extendable piston 82 moveable in directions $D_1/D_2$. Use of a solenoid can reduce parts count and system complexity. The piston 82 cooperates with a spring 84. A first end of spring 84 is attached to carrier 85A, which is attached to a static structure such as the housing 66 or the static body of solenoid 80. A second end of the spring 84 is attached to carrier 85B which is attached to the piston 82. The spring 84 can be a torsional or leaf spring, for example. The spring 84 is configured to bias the piston 82 in a direction $D_2$ toward the solenoid 80.

When the solenoid 80 is activated, the solenoid 80 extends or drives the piston 82 outward in direction $D_1$ to compress the spring 84. When the solenoid 80 is deactivated, the spring 84 returns to rest and causes the piston 82 to move inward in the direction $D_2$. In other examples, the solenoid 80 can be actuated to extend or move the piston 82 in both directions $D_1/D_2$, and the spring 84 may be utilized or omitted. In an alternative example, the actuator 78 is a rotary actuator to impart movement of the ring gear 64B. In other examples, the actuator 78 is a motor coupled to a speed reduction device or gear train to provide actuation.

A ratchet 86 is attached to, and is rotatable in a direction $R_1$ about, a pin 87 located at an end of the piston 82. The ratchet 86 has a spring-loaded catch or head moveable between a first position and a second position. The ratchet 86 rotates in a clockwise direction about the pin 87 when the ratchet 86 moves in the direction $D_1$ to engage or otherwise contact the adjacent engagement feature 76. The ratchet 86 rotates in a counter-clockwise direction about the pin 87 when the ratchet 86 continues to move in the direction $D_1$ and clears the adjacent portion of engagement feature 76. The ratchet 86 has a contact portion 86A for contacting and latching onto, or otherwise moving, the engagement feature 76. The ratchet 86 causes the engagement feature 76 to move in response to movement of the piston 82 in the direction $D_2$, which causes the ring gear 64B to rotate in a direction $R_2$ about a gear axis G of the ring gear 64B or drive assembly 60. The gear axis G of the ring gear 64B may be collinear with an axis of rotation of the sun gear 64A. Rotation of the ring gear 64B causes the output 72 and the accessory drive shaft 74 (FIG. 1) to rotate in a direction $R_3$.

The controller 90 is operatively coupled to the actuator 78. The controller 90 is operable to cause the drive assembly 60 to rotate one of the spools 30/32 at a desired rate during a slow rotation condition. The controller 90 can enable movement of the actuator 78 during a slow rotation condition and can disable movement of the actuator 78 during an engine start condition. The controller 90 can include an on-board computer, a microcontroller, one or more digital logic components, analog circuitry, or a combination thereof. In other examples, the functionality of the controller 90 is provided by a full authority digital engine control (FADEC) or another computing system of the engine 20 or the aircraft.

The drive assembly 60 can include at least one sensor 88 operatively coupled to a controller 90 for providing feedback relating to rotation. The sensor 88 is operable to detect a position of one or more of the protrusions 77 of the engagement feature 76 during a slow rotation condition. The sensor 88 can be a speed sensor to detect speed or a proximity sensor to detect relative distance. In other examples, the sensor 88 is an optical sensor or a vibration sensor that detects a frequency or amplitude of components of the drive assembly 60 relating to a rate of rotation. The sensor 88 can also be utilized detect a position of the protrusions 77 of the engagement feature 76 to for determining a rate of rotation during an engine starting condition.

The controller 90 is operable to monitor a time of arrival of each protrusion 77 and compare the time of arrival to a desired rate of rotation of output 72 and one of the spools 30/32 during a slow rotation condition. The controller 90 is operable to cause the solenoid 80 to move the piston 82 in one of directions $D_1/D_2$ in response to determining a change in position of the engagement feature 76 detected by the sensor 88. For example, the controller 90 may send a signal to the solenoid 80 corresponding to partial rotation of the accessory drive shaft 74 or one of the spools 30/32 every thirty to sixty seconds or less. The sensor 88 provides a feedback to the controller 90 that can be compared to the desired rate of rotation. The controller 90 can adjust (e.g., increase or decrease) a frequency of modulation of the solenoid 80 to approach the desired rate of rotation.

In one example, the controller 90 is coupled to at least one heat sensor 92 operable to detect a temperature at various locations of the spools 30/32 and engine case 49. The controller 90 can adjust a frequency of modulation of the solenoid 80 to approach the desired rate of rotation in response to comparing a temperature detected by the sensor 92 to a predetermined threshold or desired rate of cooling.

Figure 4A:
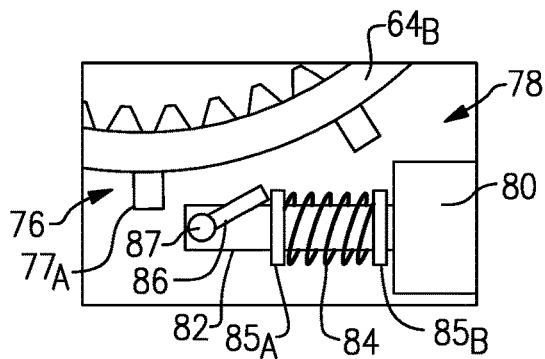
FIG. 4A illustrates selected portions of the drive assembly of FIG. 3 in a first position.
Figure 4D:
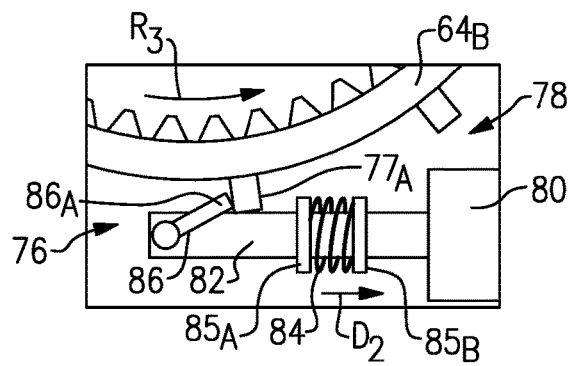
FIG. 4D illustrates selected portions of the drive assembly of FIG. 3 in a fourth position.
Figure 4B:
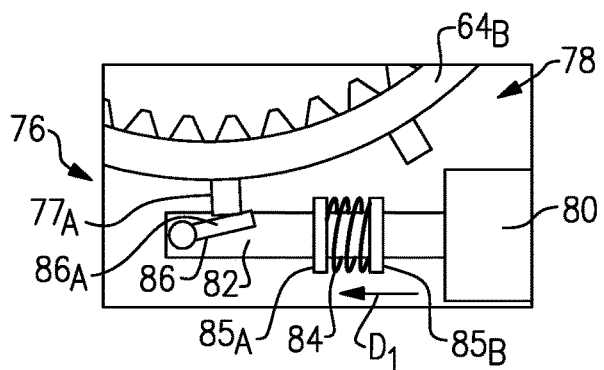
FIG. 4B illustrates selected portions of the drive assembly of FIG. 3 in a second position.
Figure 4E:
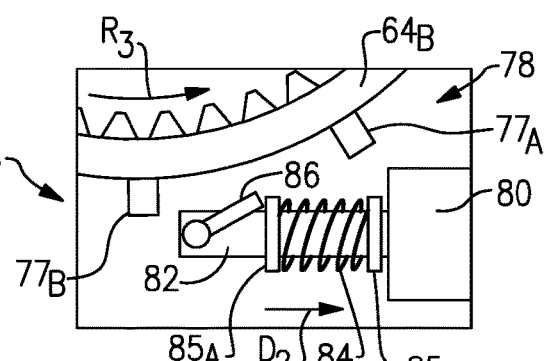
FIG. 4E illustrates selected portions of the drive assembly of FIG. 3 in a fifth position.
Figure 4C:
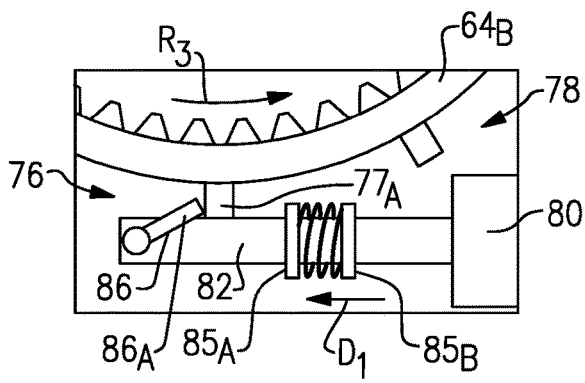
FIG. 4C illustrates selected portions of the drive assembly of FIG. 3 in a third position.

Referring to FIGS. 4A to 4E, with continued reference to FIG. 3, the drive assembly 60 operates as follows. The controller 90 determines that a slow rotation condition is met, such as after an engine shutdown condition of the engine 20. At a first position, the spring 84 is substantially decompressed, and adjacent protrusion 77A is spaced apart from the ratchet 86 (FIG. 4A). During the slow rotation condition, the controller 90 activates the solenoid 80 to compress the spring 84 and drive the piston 82 in direction $D_1$ such that the ratchet 86 contacts the protrusion 77A at a second position (FIG. 4B). The solenoid continues to extend the piston 82 in direction $D_1$ until the contact portion 86A of ratchet 86 latches onto protrusion 77A at a third position (FIG. 4C).

Once the ratchet 86 has moved past the adjacent engagement feature 76, the controller 90 deactivates the solenoid 80. This cause the spring 84 to begin decompressing, which causes the piston 82 to move in direction $D_2$ toward a fourth position such that the ratchet 86 moves the protrusion 77A (FIG. 4D). The spring 84 continues to decompress, moving the piston 82 in direction $D_2$ toward a fifth position (FIG. 4E). Movement of the protrusion 77A causes the ring gear 64B to rotate in direction $D_3$. This causes rotation of the respective spool 30/32 in response to rotation of the output 72. Since the rotating components of the engine 20 have high inertia, the rotation can continue until the next cycle of the actuator 78. During the next cycle, the controller 90 causes the ratchet 86 to engage the next adjacent protrusion 77B (FIG. 4E) to cause the ring gear 64B to further rotate in direction $D_3$.

The controller 90 can cause the actuator 78 to continue to move in directions $D_1/D_2$ at a desired rate, causing ratcheting of the engagement feature 76 in the direction $R_2$ about the axis G of the ring gear 64B, and in response to determining a change in position of the engagement feature 76. The sensor 88 can be used as a feedback device to ensure spool speed is maintained at a substantially continuous or desired rate during the slow rotation condition to provide substantially uniform heat dissipation. In alternative examples, the controller 90 causes the actuator 78 to rotate the ring gear 64B at a predetermined rate such that the sensor 88 can be omitted. Once the respective spool 30/32 begins to rotate, the actuator 78 can be modulated at a lower rate or with a lesser amount of power to provide an impulse to fight drag load rather than engine inertia observed during initial rotation.

The drive assembly 60 can be configured to transition between a slow rotation condition and an engine start condition. The drive turbine 62 is disabled during the slow rotation condition such that the actuator 78 can cause one of the spools 30/32 to rotate at a relatively slower rate than caused by the drive turbine 62 during the engine start condition. In some examples, a maximum rate of rotation of the drive assembly 60 during operation is less than a minimum rate of rotation of the drive turbine 62 during operation. In some examples, the controller 90 causes the drive assembly 60 to rotate one of the spools 30/32 at a rate of less than one revolutions per minute (RPM). In other examples, the rate of rotation is less than one revolution per every five to thirty minutes. During an engine start condition, the controller 90 disables movement of the actuator 78. The input 70 of the gear train 64 is driven by the drive turbine 62 at a desired rate of speed to cause the engine 20 to start.

The example drive assembly 60 can function to provide starting during an engine start condition, and can function to provide slow rotation of one of the spools 30/32 during a slow rotation condition for more uniformly cooling the engine case 49 adjacent to compressors 38/44 and turbines 40/46 and for reducing rotor bowing. Positioning of the engagement feature 76 relative to the gear train 64 can reduce a complexity and number of parts that may otherwise be required by providing the slow rotation functionality by another subsystem of the engine 20. The sensor 88 can be utilized to monitor a desired speed of the gear train 64 during an engine start condition, and utilization of the sensor 88 to also provide feedback during a slow rotation condition can reduce system complexity by providing both functions.

Although the different examples have a specific component shown in the illustrations, embodiments of this disclosure are not limited to those particular combinations. It is possible to use some of the components or features from one of the examples in combination with features or components from another one of the examples. It should also be understood that any particular quantities disclosed in the examples herein are provided for illustrative purposes only.

Furthermore, the foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A gas turbine engine comprising:
   a spool including a turbine section configured to drive a compressor section through a spool shaft;
   a drive assembly for driving the spool comprising:
      an epicyclic gear train having an input and an output, the input coupled to a first turbine for starting the engine, the output coupled to the spool shaft, and at least one engagement feature on a component of the gear train; and
      an actuator engageable with the at least one engagement feature to cause the spool shaft to rotate;
   an accessory gearbox interconnecting the spool shaft and the output of the epicyclic gear train;

wherein the first turbine is operable to cause the epicyclic gear train to rotate an accessory drive shaft of the accessory gearbox during an engine start condition, the accessory drive shaft mechanically coupled to the output;

wherein the epicyclic gear train is a star gear system including a sun gear, a ring gear, a plurality of star gears meshing with the sun gear and the ring gear, and a carrier;

wherein the input of the epicyclic gear train is defined by the sun gear, and the output of the epicyclic gear train is defined by the ring gear such that the epicyclic gear train interconnects the first turbine and the accessory gearbox;

wherein the accessory gearbox drive one or more accessory components;

wherein the drive assembly includes a housing defining a cavity;

wherein the first turbine, the gear train and the actuator are located at least partially in the cavity;

wherein the ring gear defines the at least one engagement feature, and the at least one engagement feature defines one or more protrusions circumferentially arranged about a perimeter of the ring gear; and wherein the turbine section includes a low pressure turbine and a high pressure turbine, the spool shaft coupled to one of the low pressure turbine and the high pressure turbine.

2. The gas turbine engine as recited in claim 1, comprising:
a sensor operable to detect a position of the at least one engagement feature;
a controller coupled to the actuator and the sensor;
wherein the actuator includes a ratchet operable to move the at least one engagement feature; and
wherein the controller is operable to cause the ratchet to engage the at least one engagement feature in response to determining a change in position of the at least one engagement feature.

3. The gas turbine engine as recited in claim 1, comprising:
an engine case at least partially surrounding the spool;
a sensor operable to detect a position of the at least one engagement feature;
a controller coupled to the actuator and the sensor;
wherein the housing is external to the engine case;
wherein the actuator includes a solenoid having an extendable piston, and a ratchet located at an end of the piston, the ratchet having a contact portion operable to move the at least one engagement feature in response to movement of the piston, and the ratchet is rotatable about a pin at an end of the piston;
wherein the controller is operable to cause the ratchet to engage the at least one engagement feature in response to determining a change in position of the at least one engagement feature; and
wherein the first turbine is a pneumatic turbine operable to cause the epicyclic gear train to rotate the accessory drive shaft during an engine start condition, the actuator being in a disengaged position during the engine start condition.

* * * * *